US008271378B2

(12) United States Patent
Chaudhuri et al.

(10) Patent No.: US 8,271,378 B2
(45) Date of Patent: *Sep. 18, 2012

(54) SYSTEMS AND METHODS FOR DETERMINING THIN-FILE RECORDS AND DETERMINING THIN-FILE RISK LEVELS

(75) Inventors: Anamitra Chaudhuri, Belle Mead, NJ (US); Nancy A. Hadenfeldt, Lincoln, NE (US); Erik Hjermstad, Lincoln, NE (US)

(73) Assignee: Experian Marketing Solutions, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,555

(22) Filed: Sep. 19, 2011

(65) Prior Publication Data
US 2012/0158575 A1  Jun. 21, 2012

Related U.S. Application Data

(63) Continuation of application No. 12/818,096, filed on Jun. 17, 2010, now Pat. No. 8,024,264, which is a continuation of application No. 11/871,572, filed on Oct. 12, 2007, now Pat. No. 7,742,982.

(60) Provisional application No. 60/923,060, filed on Apr. 12, 2007.

(51) Int. Cl.
*G06Q 40/00* (2012.01)
(52) U.S. Cl. ............... 705/38; 705/36; 705/99
(58) Field of Classification Search .......... 705/36, 705/38, 39
See application file for complete search history.

(56) References Cited

U.S. PATENT DOCUMENTS

| | | | |
|---|---|---|---|
| 4,775,935 A | 10/1988 | Yourick |
| 4,827,508 A | 5/1989 | Shear |
| 4,868,570 A | 9/1989 | Davis |
| 4,872,113 A | 10/1989 | Dinerstein |

(Continued)

FOREIGN PATENT DOCUMENTS

CN  1290372  5/2001

(Continued)

OTHER PUBLICATIONS

Sara Burr, Ph. D., Asset Builders of America, Inc. and Virginia Carlson, Ph. D., University of Wisconsin-Milwaukee, Utility Payments as Alternative Credit Data: A Reality Check, Oct. 5, 2006 ("AssetBuilders").*

(Continued)

*Primary Examiner* — Charles Kyle
*Assistant Examiner* — Clifford Madamba
(74) *Attorney, Agent, or Firm* — Knobbe Martens Olson & Bear LLP

(57) ABSTRACT

In some embodiments, systems and methods are disclosed for generating filters to determine whether a consumer is likely to have a scoreable credit record based on non-credit data, and to determine a potential risk level associated with an unscoreable credit record based on non-credit data. Existing scoreable and unscoreable records are compared to determine factors correlated with having an unscoreable record, and a multi-level filter is developed. Unscoreable records having at least one entry are compared to determine whether they are "good" or "bad" risks, factors correlated with either condition are determined, and a filter is developed. The filters can be applied to records comprising demographic data to determine consumers that are likely to have unscoreable records but represent good risks.

11 Claims, 7 Drawing Sheets

U.S. PATENT DOCUMENTS

| | | |
|---|---|---|
| 4,935,870 A | 6/1990 | Burk, Jr. et al. |
| 4,982,346 A | 1/1991 | Girouard et al. |
| 5,056,019 A | 10/1991 | Schultz et al. |
| 5,201,010 A | 4/1993 | Deaton et al. |
| 5,247,575 A | 9/1993 | Sprague et al. |
| 5,274,547 A | 12/1993 | Zoffel et al. |
| 5,283,731 A | 2/1994 | Lalonde et al. |
| 5,305,195 A | 4/1994 | Murphy |
| 5,325,509 A | 6/1994 | Lautzenheiser |
| 5,341,429 A | 8/1994 | Stringer et al. |
| 5,459,306 A | 10/1995 | Stein et al. |
| 5,504,675 A | 4/1996 | Cragun et al. |
| 5,515,098 A | 5/1996 | Carles |
| 5,521,813 A | 5/1996 | Fox et al. |
| 5,528,701 A | 6/1996 | Aref |
| 5,555,409 A | 9/1996 | Leenstra, Sr. et al. |
| 5,583,763 A | 12/1996 | Atcheson et al. |
| 5,592,560 A | 1/1997 | Deaton et al. |
| 3,316,395 A | 4/1997 | Lavin |
| 5,627,973 A | 5/1997 | Armstrong et al. |
| 5,640,551 A | 6/1997 | Chu et al. |
| 5,649,114 A | 7/1997 | Deaton et al. |
| 5,655,129 A | 8/1997 | Ito |
| 5,659,731 A | 8/1997 | Gustafson |
| 5,661,516 A | 8/1997 | Carles |
| 5,666,528 A | 9/1997 | Thai |
| 5,692,107 A | 11/1997 | Simoudis et al. |
| 5,696,907 A | 12/1997 | Tom |
| 5,737,732 A | 4/1998 | Gibson et al. |
| 5,740,549 A | 4/1998 | Reilly et al. |
| 5,754,938 A | 5/1998 | Herz et al. |
| 5,768,423 A | 6/1998 | Aref et al. |
| 5,774,692 A | 6/1998 | Boyer et al. |
| 5,774,868 A | 6/1998 | Cragun et al. |
| 5,778,405 A | 7/1998 | Ogawa |
| 5,797,136 A | 8/1998 | Boyer et al. |
| 5,802,142 A | 9/1998 | Browne |
| 5,812,840 A | 9/1998 | Shwartz |
| 5,819,226 A | 10/1998 | Gopinathan et al. |
| 5,822,410 A | 10/1998 | McCausland et al. |
| 5,822,750 A | 10/1998 | Jou et al. |
| 5,822,751 A | 10/1998 | Gray et al. |
| 5,835,915 A | 11/1998 | Carr et al. |
| 5,848,396 A | 12/1998 | Gerace |
| 5,857,175 A | 1/1999 | Day et al. |
| 5,873,068 A | 2/1999 | Beaumont et al. |
| 5,881,131 A | 3/1999 | Farris et al. |
| 5,884,287 A | 3/1999 | Edesess |
| 5,905,985 A | 5/1999 | Malloy et al. |
| 5,926,800 A | 7/1999 | Baronowski et al. |
| 5,933,813 A | 8/1999 | Teicher et al. |
| 5,944,790 A | 8/1999 | Levy |
| 5,953,707 A | 9/1999 | Huang et al. |
| 5,963,932 A | 10/1999 | Jakobsson et al. |
| 5,974,396 A | 10/1999 | Anderson et al. |
| 5,991,735 A | 11/1999 | Gerace |
| 6,009,415 A | 12/1999 | Shurling et al. |
| 6,018,723 A | 1/2000 | Siegel et al. |
| 6,029,139 A | 2/2000 | Cunningham et al. |
| 6,044,357 A | 3/2000 | Garg |
| 6,070,147 A | 5/2000 | Harms et al. |
| 6,073,140 A | 6/2000 | Morgan et al. |
| 6,101,486 A | 8/2000 | Roberts et al. |
| 6,119,103 A | 9/2000 | Basch et al. |
| 6,121,901 A | 9/2000 | Welch et al. |
| 6,128,624 A | 10/2000 | Papierniak et al. |
| 6,144,948 A | 11/2000 | Walker et al. |
| 6,144,957 A | 11/2000 | Cohen et al. |
| 6,151,601 A | 11/2000 | Papierniak et al. |
| 6,182,060 B1 | 1/2001 | Hedgcock et al. |
| 6,202,053 B1 | 3/2001 | Christiansen et al. |
| 6,208,979 B1 | 3/2001 | Sinclair |
| 6,223,171 B1 | 4/2001 | Chaudhuri et al. |
| 6,236,977 B1 | 5/2001 | Verba et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,269,325 B1 | 7/2001 | Lee et al. |
| 6,289,318 B1 | 9/2001 | Barber |
| 6,298,330 B1 | 10/2001 | Gardenswartz et al. |
| 6,304,869 B1 | 10/2001 | Moore et al. |
| 6,311,169 B2 | 10/2001 | Duhon |
| 6,317,752 B1 | 11/2001 | Lee et al. |
| 6,321,205 B1 | 11/2001 | Eder |
| 6,324,566 B1 | 11/2001 | Himmel et al. |
| 6,330,546 B1 | 12/2001 | Gopinathan et al. |
| 6,334,110 B1 | 12/2001 | Walter et al. |
| 6,339,769 B1 | 1/2002 | Cochrane et al. |
| 6,366,903 B1 | 4/2002 | Agrawal et al. |
| 6,385,592 B1 | 5/2002 | Angles et al. |
| 6,393,406 B1 | 5/2002 | Eder |
| 6,412,012 B1 | 6/2002 | Bieganski et al. |
| 6,430,539 B1 | 8/2002 | Lazarus et al. |
| 6,442,577 B1 | 8/2002 | Britton et al. |
| 6,460,036 B1 | 10/2002 | Herz |
| 6,496,819 B1 | 12/2002 | Bello et al. |
| 6,505,168 B1 | 1/2003 | Rothman et al. |
| 6,505,176 B2 | 1/2003 | DeFrancesco, Jr. et al. |
| 6,513,018 B1 | 1/2003 | Culhane |
| 6,523,022 B1 | 2/2003 | Hobbs |
| 6,523,041 B1 | 2/2003 | Morgan et al. |
| 6,542,894 B1 | 4/2003 | Lee et al. |
| 6,574,623 B1 | 6/2003 | Leung et al. |
| 6,597,775 B2 | 7/2003 | Lawyer et al. |
| 6,598,030 B1 | 7/2003 | Siegel et al. |
| 6,615,247 B1 | 9/2003 | Murphy |
| 6,623,529 B1 | 9/2003 | Lakritz |
| 6,631,496 B1 | 10/2003 | Li et al. |
| 6,640,215 B1 | 10/2003 | Galperin et al. |
| 6,651,220 B1 | 11/2003 | Penteroudakis et al. |
| 6,658,393 B1 | 12/2003 | Basch et al. |
| 6,665,715 B1 | 12/2003 | Houri |
| 6,698,020 B1 | 2/2004 | Zigmond et al. |
| 6,757,740 B1 | 6/2004 | Parekh et al. |
| 6,766,327 B2 | 7/2004 | Morgan, Jr. et al. |
| 6,782,390 B2 | 8/2004 | Lee et al. |
| 6,804,701 B2 | 10/2004 | Muret et al. |
| 6,810,356 B1 | 10/2004 | Garcia-Franco et al. |
| 6,823,319 B1 | 11/2004 | Lynch et al. |
| 6,839,682 B1 | 1/2005 | Blume et al. |
| 6,850,606 B2 | 2/2005 | Lawyer et al. |
| 6,850,895 B2 | 2/2005 | Brodersen et al. |
| 6,873,979 B2 | 3/2005 | Fishman et al. |
| 6,925,441 B1 | 8/2005 | Jones, III et al. |
| 6,934,714 B2 | 8/2005 | Meinig |
| 6,959,281 B1 | 10/2005 | Freeling et al. |
| 6,983,478 B1 | 1/2006 | Grauch et al. |
| 7,003,504 B1 | 2/2006 | Angus et al. |
| 7,003,792 B1 | 2/2006 | Yuen |
| 7,028,052 B2 | 4/2006 | Chapman et al. |
| 7,033,792 B2 | 4/2006 | Zhong et al. |
| 7,047,251 B2 | 5/2006 | Reed et al. |
| 7,050,989 B1 | 5/2006 | Hurt et al. |
| 7,054,828 B2 | 5/2006 | Heching et al. |
| 7,072,853 B2 | 7/2006 | Shkedi |
| 7,072,963 B2 | 7/2006 | Anderson et al. |
| 7,082,435 B1 | 7/2006 | Guzman et al. |
| 7,120,599 B2 | 10/2006 | Keyes |
| 7,136,448 B1 | 11/2006 | Venkataperumal et al. |
| 7,139,734 B2 | 11/2006 | Nathans et al. |
| 7,150,030 B1 | 12/2006 | Eldering et al. |
| 7,152,018 B2 | 12/2006 | Wicks |
| 7,152,237 B2 | 12/2006 | Flickinger et al. |
| 7,184,974 B2 | 2/2007 | Shishido |
| 7,185,016 B1 | 2/2007 | Rasmussen |
| 7,185,353 B2 | 2/2007 | Schlack |
| 7,200,602 B2 | 4/2007 | Jonas |
| 7,240,059 B2 | 7/2007 | Bayliss et al. |
| 7,246,740 B2 | 7/2007 | Swift et al. |
| 7,249,048 B1 | 7/2007 | O'Flaherty |
| 7,275,083 B1 | 9/2007 | Seibel et al. |
| 7,277,900 B1 | 10/2007 | Ganesh et al. |
| 7,296,734 B2 | 11/2007 | Pliha |
| 7,328,169 B2 | 2/2008 | Temares et al. |
| 7,360,251 B2 | 4/2008 | Spalink et al. |
| 7,366,694 B2 | 4/2008 | Lazerson |
| 7,367,011 B2 | 4/2008 | Ramsey et al. |

| | | |
|---|---|---|
| 7,370,044 B2 | 5/2008 | Mulhern et al. |
| 7,376,603 B1 | 5/2008 | Mayr et al. |
| 7,383,215 B1 | 6/2008 | Navarro et al. |
| 7,403,942 B1 | 7/2008 | Bayliss |
| 7,421,442 B2 | 9/2008 | Gelb et al. |
| 7,428,509 B2 | 9/2008 | Klebanoff |
| 7,428,526 B2 | 9/2008 | Miller et al. |
| 7,433,855 B2 | 10/2008 | Gavan et al. |
| 7,467,127 B1 | 12/2008 | Baccash et al. |
| 7,472,088 B2 | 12/2008 | Taylor et al. |
| 7,475,118 B2 | 1/2009 | Leiba et al. |
| 7,483,842 B1 | 1/2009 | Fung et al. |
| 7,536,346 B2 | 5/2009 | Aliffi et al. |
| 7,546,619 B2 | 6/2009 | Anderson et al. |
| 7,556,192 B2 | 7/2009 | Wokaty, Jr. |
| 7,562,093 B2 | 7/2009 | Gelb et al. |
| 7,571,139 B1 | 8/2009 | Giordano et al. |
| 7,580,856 B1 | 8/2009 | Pliha |
| 7,584,146 B1 | 9/2009 | Duhon |
| 7,590,589 B2 | 9/2009 | Hoffberg |
| 7,596,512 B1 | 9/2009 | Raines et al. |
| 7,610,257 B1 | 10/2009 | Abrahams |
| 7,647,344 B2 | 1/2010 | Skurtovich et al. |
| 7,653,592 B1 | 1/2010 | Flaxman |
| 7,653,593 B2 | 1/2010 | Zarikian et al. |
| 7,668,769 B2 | 2/2010 | Baker et al. |
| 7,668,840 B2 | 2/2010 | Bayliss et al. |
| 7,672,865 B2 | 3/2010 | Kumar et al. |
| 7,698,163 B2 | 4/2010 | Reed et al. |
| 7,698,236 B2 | 4/2010 | Cox et al. |
| 7,707,059 B2 | 4/2010 | Reed et al. |
| 7,725,300 B2 | 5/2010 | Pinto et al. |
| 7,730,509 B2 | 6/2010 | Boulet et al. |
| 7,734,523 B1 | 6/2010 | Cui et al. |
| 7,742,982 B2 | 6/2010 | Chaudhuri et al. |
| 7,848,987 B2 | 12/2010 | Haig |
| 7,849,004 B2 | 12/2010 | Choudhuri et al. |
| 7,856,397 B2 | 12/2010 | Whipple et al. |
| 7,877,322 B2 | 1/2011 | Nathans et al. |
| 7,904,366 B2 | 3/2011 | Pogust |
| 7,954,698 B1 | 6/2011 | Pliha |
| 7,983,932 B2 | 7/2011 | Kane |
| 7,991,689 B1 | 8/2011 | Brunzell et al. |
| 7,996,521 B2 | 8/2011 | Chamberlain et al. |
| 8,024,264 B2 | 9/2011 | Chaudhuri et al. |
| 8,135,607 B2 | 3/2012 | Williams et al. |
| 2001/0037332 A1 | 11/2001 | Miller et al. |
| 2001/0039523 A1 | 11/2001 | Iwamoto |
| 2001/0044766 A1 | 11/2001 | Keyes |
| 2001/0049620 A1 | 12/2001 | Blasko |
| 2002/0023051 A1 | 2/2002 | Kunzle et al. |
| 2002/0026411 A1 | 2/2002 | Nathans et al. |
| 2002/0046099 A1 | 4/2002 | Frengut et al. |
| 2002/0049968 A1 | 4/2002 | Wilson et al. |
| 2002/0055906 A1 | 5/2002 | Katz et al. |
| 2002/0072927 A1 | 6/2002 | Phelan et al. |
| 2002/0077964 A1 | 6/2002 | Brody et al. |
| 2002/0099628 A1 | 7/2002 | Takaoka et al. |
| 2002/0123904 A1 | 9/2002 | Amengual et al. |
| 2002/0123928 A1 | 9/2002 | Eldering et al. |
| 2002/0128960 A1 | 9/2002 | Lambiotte et al. |
| 2002/0129368 A1 | 9/2002 | Schlack et al. |
| 2002/0133404 A1 | 9/2002 | Pedersen |
| 2002/0138297 A1 | 9/2002 | Lee |
| 2002/0147695 A1 | 10/2002 | Khedkar et al. |
| 2002/0165839 A1 | 11/2002 | Taylor et al. |
| 2002/0173984 A1 | 11/2002 | Robertson et al. |
| 2002/0184255 A1 | 12/2002 | Edd et al. |
| 2002/0194103 A1 | 12/2002 | Nabe |
| 2002/0198824 A1 | 12/2002 | Cook |
| 2003/0018549 A1 | 1/2003 | Fei et al. |
| 2003/0033242 A1 | 2/2003 | Lynch et al. |
| 2003/0036996 A1 | 2/2003 | Lazerson |
| 2003/0041050 A1 | 2/2003 | Smith et al. |
| 2003/0046223 A1 | 3/2003 | Crawford et al. |
| 2003/0050882 A1 | 3/2003 | Degen et al. |
| 2003/0065563 A1 | 4/2003 | Elliott et al. |
| 2003/0083893 A1 | 5/2003 | Aliffi et al. |
| 2003/0093289 A1 | 5/2003 | Thornley et al. |
| 2003/0097329 A1 | 5/2003 | Nabe et al. |
| 2003/0097380 A1 | 5/2003 | Mulhern et al. |
| 2003/0105728 A1 | 6/2003 | Yano et al. |
| 2003/0171942 A1 | 9/2003 | Gaito |
| 2003/0191731 A1 | 10/2003 | Stewart et al. |
| 2003/0195830 A1 | 10/2003 | Merkoulovitch et al. |
| 2003/0208362 A1 | 11/2003 | Enthoven et al. |
| 2003/0212618 A1 | 11/2003 | Keyes et al. |
| 2003/0212654 A1 | 11/2003 | Harper et al. |
| 2003/0216965 A1 | 11/2003 | Libman |
| 2003/0217003 A1 | 11/2003 | Weinflash et al. |
| 2003/0233323 A1 | 12/2003 | Bilski et al. |
| 2003/0236738 A1 | 12/2003 | Lange et al. |
| 2004/0006536 A1 | 1/2004 | Kawashima et al. |
| 2004/0030667 A1 | 2/2004 | Xu et al. |
| 2004/0039686 A1 | 2/2004 | Klebanoff |
| 2004/0044615 A1 | 3/2004 | Xue et al. |
| 2004/0044617 A1 | 3/2004 | Lu |
| 2004/0062213 A1 | 4/2004 | Koss |
| 2004/0064402 A1 | 4/2004 | Dreyer et al. |
| 2004/0078809 A1 | 4/2004 | Drazin |
| 2004/0102197 A1 | 5/2004 | Dietz |
| 2004/0107125 A1 | 6/2004 | Guheen et al. |
| 2004/0111358 A1 | 6/2004 | Lange et al. |
| 2004/0111363 A1 | 6/2004 | Trench et al. |
| 2004/0117358 A1 | 6/2004 | Von Kaenel et al. |
| 2004/0122730 A1 | 6/2004 | Tucciarone et al. |
| 2004/0122735 A1 | 6/2004 | Meshkin |
| 2004/0128150 A1 | 7/2004 | Lundegren |
| 2004/0128193 A1 | 7/2004 | Brice et al. |
| 2004/0139025 A1 | 7/2004 | Coleman |
| 2004/0153448 A1 | 8/2004 | Cheng et al. |
| 2004/0158520 A1 | 8/2004 | Noh |
| 2004/0163101 A1 | 8/2004 | Swix et al. |
| 2004/0177030 A1 | 9/2004 | Shoham |
| 2004/0186807 A1 | 9/2004 | Nathans et al. |
| 2004/0193535 A1 | 9/2004 | Barazesh |
| 2004/0199456 A1 | 10/2004 | Flint et al. |
| 2004/0199584 A1 | 10/2004 | Kirshenbaum et al. |
| 2004/0205157 A1 | 10/2004 | Bibelnieks et al. |
| 2004/0220896 A1 | 11/2004 | Finlay et al. |
| 2004/0225596 A1 | 11/2004 | Kemper et al. |
| 2004/0243588 A1 | 12/2004 | Tanner et al. |
| 2005/0004805 A1 | 1/2005 | Srinivasan |
| 2005/0021397 A1 | 1/2005 | Cui et al. |
| 2005/0027632 A1 | 2/2005 | Zeitoun et al. |
| 2005/0027633 A1 | 2/2005 | Fortuna et al. |
| 2005/0038726 A1 | 2/2005 | Salomon et al. |
| 2005/0050027 A1 | 3/2005 | Yeh et al. |
| 2005/0086579 A1 | 4/2005 | Leitner et al. |
| 2005/0102206 A1 | 5/2005 | Savasoglu et al. |
| 2005/0102226 A1 | 5/2005 | Oppenheimer et al. |
| 2005/0125350 A1 | 6/2005 | Tidwell et al. |
| 2005/0130704 A1 | 6/2005 | McParland et al. |
| 2005/0137899 A1 | 6/2005 | Davies et al. |
| 2005/0144067 A1 | 6/2005 | Farahat et al. |
| 2005/0154664 A1 | 7/2005 | Guy et al. |
| 2005/0197953 A1 | 9/2005 | Broadbent et al. |
| 2005/0204381 A1 | 9/2005 | Ludvig et al. |
| 2005/0209892 A1 | 9/2005 | Miller |
| 2005/0209922 A1 | 9/2005 | Hofmeister |
| 2005/0222906 A1 | 10/2005 | Chen |
| 2005/0251820 A1 | 11/2005 | Stefanik et al. |
| 2005/0278246 A1 | 12/2005 | Friedman et al. |
| 2005/0278743 A1 | 12/2005 | Flickinger et al. |
| 2005/0279824 A1 | 12/2005 | Anderson et al. |
| 2005/0288954 A1 | 12/2005 | McCarthy et al. |
| 2006/0004731 A1 | 1/2006 | Seibel et al. |
| 2006/0041443 A1 | 2/2006 | Horvath |
| 2006/0059073 A1 | 3/2006 | Walzak |
| 2006/0074991 A1 | 4/2006 | Lussier et al. |
| 2006/0129428 A1 | 6/2006 | Wennberg |
| 2006/0149674 A1 | 7/2006 | Cook et al. |
| 2006/0184440 A1 | 8/2006 | Britti et al. |
| 2006/0184585 A1 | 8/2006 | Grear et al. |
| 2006/0195688 A1 | 8/2006 | Drissi et al. |
| 2006/0195866 A1 | 8/2006 | Thukral |
| 2006/0206379 A1 | 9/2006 | Rosenberg |
| 2006/0212353 A1 | 9/2006 | Roslov et al. |

| Publication | Date | Inventor |
|---|---|---|
| 2006/0224696 A1 | 10/2006 | King et al. |
| 2006/0230415 A1 | 10/2006 | Roeding |
| 2006/0241923 A1 | 10/2006 | Xu et al. |
| 2006/0242039 A1 | 10/2006 | Haggerty et al. |
| 2006/0242046 A1 | 10/2006 | Haggerty et al. |
| 2006/0242049 A1 | 10/2006 | Haggerty et al. |
| 2006/0242050 A1 | 10/2006 | Haggerty et al. |
| 2006/0242051 A1 | 10/2006 | Haggerty et al. |
| 2006/0282359 A1 | 12/2006 | Nobili et al. |
| 2006/0282856 A1 | 12/2006 | Errico et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293954 A1 | 12/2006 | Anderson et al. |
| 2006/0293955 A1 | 12/2006 | Wilson et al. |
| 2006/0294199 A1 | 12/2006 | Bertholf |
| 2007/0011020 A1 | 1/2007 | Martin |
| 2007/0011039 A1 | 1/2007 | Oddo |
| 2007/0022032 A1 | 1/2007 | Anderson et al. |
| 2007/0022297 A1 | 1/2007 | Britti et al. |
| 2007/0038497 A1 | 2/2007 | Britti et al. |
| 2007/0055618 A1 | 3/2007 | Pogust |
| 2007/0055621 A1 | 3/2007 | Tischler et al. |
| 2007/0061195 A1 | 3/2007 | Liu et al. |
| 2007/0061243 A1 | 3/2007 | Ramer et al. |
| 2007/0067235 A1 | 3/2007 | Nathans et al. |
| 2007/0067297 A1 | 3/2007 | Kublickis |
| 2007/0078835 A1 | 4/2007 | Donnelli |
| 2007/0106582 A1 | 5/2007 | Baker et al. |
| 2007/0192165 A1 | 8/2007 | Haggerty et al. |
| 2007/0192409 A1 | 8/2007 | Kleinstern et al. |
| 2007/0208619 A1 | 9/2007 | Branam et al. |
| 2007/0214076 A1 | 9/2007 | Robida et al. |
| 2007/0220553 A1 | 9/2007 | Branam et al. |
| 2007/0226093 A1 | 9/2007 | Chan et al. |
| 2007/0226130 A1 | 9/2007 | Haggerty et al. |
| 2007/0233857 A1 | 10/2007 | Cheng et al. |
| 2007/0244732 A1 | 10/2007 | Chatterji et al. |
| 2007/0255645 A1* | 11/2007 | Morris et al. .................. 705/38 |
| 2007/0255646 A1 | 11/2007 | Morris et al. |
| 2007/0282684 A1 | 12/2007 | Prosser et al. |
| 2007/0282730 A1 | 12/2007 | Carpenter et al. |
| 2007/0282736 A1 | 12/2007 | Conlin et al. |
| 2007/0288271 A1 | 12/2007 | Klinkhammer |
| 2007/0288950 A1 | 12/2007 | Downey et al. |
| 2007/0288953 A1 | 12/2007 | Sheeman et al. |
| 2008/0005313 A1 | 1/2008 | Flake et al. |
| 2008/0010206 A1 | 1/2008 | Coleman |
| 2008/0021802 A1 | 1/2008 | Pendleton |
| 2008/0027859 A1 | 1/2008 | Nathans et al. |
| 2008/0028067 A1 | 1/2008 | Berkhin et al. |
| 2008/0059224 A1 | 3/2008 | Schechter |
| 2008/0059317 A1 | 3/2008 | Chandran et al. |
| 2008/0065774 A1 | 3/2008 | Keeler |
| 2008/0110973 A1 | 5/2008 | Nathans et al. |
| 2008/0120155 A1 | 5/2008 | Pliha |
| 2008/0177836 A1 | 7/2008 | Bennett |
| 2008/0184289 A1 | 7/2008 | Cristofalo et al. |
| 2008/0228635 A1 | 9/2008 | Megdal et al. |
| 2008/0243680 A1 | 10/2008 | Megdal et al. |
| 2008/0255897 A1 | 10/2008 | Megdal et al. |
| 2008/0294540 A1 | 11/2008 | Celka et al. |
| 2008/0301016 A1 | 12/2008 | Durvasula et al. |
| 2008/0301727 A1 | 12/2008 | Cristofalo et al. |
| 2008/0320575 A1 | 12/2008 | Gelb et al. |
| 2009/0018996 A1 | 1/2009 | Hunt et al. |
| 2009/0024505 A1 | 1/2009 | Patel et al. |
| 2009/0044246 A1 | 2/2009 | Sheehan et al. |
| 2009/0044279 A1 | 2/2009 | Crawford et al. |
| 2009/0048877 A1 | 2/2009 | Binns et al. |
| 2009/0094640 A1 | 4/2009 | Anderson et al. |
| 2009/0112650 A1 | 4/2009 | Iwane |
| 2009/0132559 A1 | 5/2009 | Chamberlain et al. |
| 2009/0133058 A1 | 5/2009 | Kouritzin et al. |
| 2009/0198612 A1 | 8/2009 | Meimes et al. |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0288109 A1 | 11/2009 | Downey et al. |
| 2010/0037255 A1 | 2/2010 | Sheehan et al. |
| 2010/0094758 A1 | 4/2010 | Chamberlain et al. |
| 2010/0138290 A1 | 6/2010 | Zschocke et al. |
| 2010/0145836 A1 | 6/2010 | Baker et al. |
| 2010/0145847 A1 | 6/2010 | Zarikian et al. |
| 2010/0185546 A1 | 7/2010 | Pollard |
| 2011/0047071 A1 | 2/2011 | Choudhuri et al. |
| 2011/0093383 A1 | 4/2011 | Haggerty et al. |
| 2011/0112958 A1 | 5/2011 | Haggerty et al. |
| 2012/0095927 A1 | 4/2012 | Hirtenstein et al. |

FOREIGN PATENT DOCUMENTS

| | | |
|---|---|---|
| CN | 1290373 | 5/2001 |
| EP | 0749081 | 12/1966 |
| EP | 0419889 | 4/1991 |
| EP | 0458698 | 11/1991 |
| EP | 0559358 | 9/1993 |
| EP | 0977128 | 2/2000 |
| EP | 1122664 | 8/2001 |
| EP | 0772836 | 12/2001 |
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003 016261 | 1/2003 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| TW | 256569 | 6/2006 |
| WO | WO 95/34155 | 12/1995 |
| WO | WO 96/00945 | 1/1996 |
| WO | WO 97/23838 | 7/1997 |
| WO | WO 98/41931 | 9/1998 |
| WO | WO 98/41932 | 9/1998 |
| WO | WO 98/41933 | 9/1998 |
| WO | WO 99/04350 | 1/1999 |
| WO | WO 99/17225 | 4/1999 |
| WO | WO 99/17226 | 4/1999 |
| WO | WO 99/22328 | 5/1999 |
| WO | WO 99/33012 | 7/1999 |
| WO | WO 99/38094 | 7/1999 |
| WO | WO 99/46710 | 9/1999 |
| WO | WO 00/04465 | 1/2000 |
| WO | WO 00/28441 | 5/2000 |
| WO | WO 00/55790 | 9/2000 |
| WO | WO 01/11522 | 2/2001 |
| WO | WO 01/25896 | 4/2001 |
| WO | WO 01/75754 | 10/2001 |
| WO | WO 03/101123 | 12/2003 |
| WO | WO 2004/051436 | 6/2004 |
| WO | WO 2004/114160 | 12/2004 |
| WO | WO 2006/099492 | 9/2006 |
| WO | WO 2007/014271 | 2/2007 |
| WO | WO 2007/149941 | 12/2007 |
| WO | WO 2008/076343 | 6/2008 |
| WO | WO 2008/127288 | 10/2008 |

OTHER PUBLICATIONS

U.S. Appl. No. 12/705,489, filed Feb. 12, 2010, Bargoli et al.
U.S. Appl. No. 12/705,511, filed Feb. 12, 2010, Bargoli et al.
"Intelligent Miner Applications Guide"; Chapters 4-7; pp. 33-132; IBM Corp., 1999.
"Japan's JAAI system appraises used cars over internet", Asia Pulse Mar. 3, 2000.
"WashingtonPost.com and Cars.com launch comprehensive automotive web site for the Washington area". PR Newswire, Oct. 22, 1998.
"What is MOSAIC™;" from www.appliedgeographic.com/mosaic. html dated Feb. 15, 2004 as accessed from <http://web.archive.org/web/20040215224329/http://www.appliedgeographic.com/mosaic.html>, Mar. 9, 2012.
Burr Ph.D., et al. , Utility Payments as Alternative Credit Data: A Reality Check, Asset Builders of America, Inc., Oct. 5, 2006, pp. 1-18, Washington, D.C.
Caliendo, et al.; "Some Practical Guidance for the Implementation of Propensity Score Matching"; IZA: Discussion Paper Series; No. 1588; Germany; May 2005.
ChannelWave.com, PRM Central—About PRM, <http://web.archive.org/web/20000510214859/http://www.channelwave.com> as printed on Jun. 21, 2006, May 2000 Archive.
deGruchy, et al., "Geodennographic Profiling Benefits Stop-Smoking Service;" The British Journal of Healthcare Computing & Information Management; Feb. 2007; 24, 7; pp. 29-31.
Experian and AGS Select SRC to Deliver Complete Marketing Solutions; Partnership First to Marketplace with Census2000 Data. PR Newswire. New York: Mar. 21, 2001. p. 1.
Fanelli, Marc; "Building a Holistic Customer View"; MultiChannel Merchant; pp. 2; Jun. 26, 2006.
McManus et al.; "Street Wiser," American Demographics; ABI/Inform Global; Jul./Aug. 2003; 25, 6; pp. 32-35.
Miller, Joe, "NADA used-car prices go online". Automotive News, Jun. 14, 1999, p. 36.
Sawyers, Arlene "NADA to offer residual guide". Automotive News, May 22, 2000, p. 3.
Service Objects: Insight on Demand, Instant Contact Analysis and Lead Verification Solutions, DOTS Web Services—Product Directory, downloaded from www.serviceobjects.com/products/directory_of_web_services.asp, printed Mar. 8, 2011 in 3 pages.
Tao, Lixin; "Shifting Paradigms with the Application Service Provider Model"; Concordia University, Canada; IEEE; Oct. 2001.
Thoemmes, Felix; "Propensity Score Matching in SPSS"; Center for Educational Science and Psychology, University of Tübingen; Jan. 2012.
Webber, Richard; "The Relative Power of Geodemographics vis a vis Person and Household Level Demographic Variables as Discriminators of Consumer Behavior;" CASA:Working Paper Series; <http://www.casa.ucl.ac.uk/working_papers/paper84.pdf>; pp. 17; Oct. 2004.
Web Page posted at: http://web.archive.org/web20040805124909/http://www.oracle.com/technology/sample_codete/tech/pl_sql/htdocs/x/Case/start.htm, pp. 1 and 4 of the webs page posted on Jan. 7, 2003.
"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.
"Accenture Newsroom: Accenture Completes Acquisition of Media Audits: Acquisition Expands Company's Marketing Sciences and Data Services Capabilities," ACCENTURE.COM, Dec. 12, 2005, 2 pages, http://accenture.tekgroup.com/article_display.cfm?article_id=4282.
Adweek, "Aim High: Ad Targeting Moves to the Next Level," dated Jan. 21, 2008 as downloaded from http://www.adweek.com/aw/magazine/article_display.isp?vnu on Apr. 16, 2008.
Adzilla, Press Release, "ZILLACASTING technology approved and patent pending," dated May 16, 2005 as downloaded from http://www.adzilla.com/newsroom/pdf/patent_051605.pdf on May 28, 2008.

"Arbitron 2006 Black Consumers," Arbitron Inc., LVTSG.COM, Jul. 8, 2006, 2 pages, http://www.lvtsg.com/news/publish/Factoids/article_3648.shtml.
"Atlas on Demand and C-COR Join Forces to Offer Advertising Management Solution for On Demand TV: Global Provider of On Demand Systems Partners with Atlas to Develop and Market Comprehensive VOD Advertising Solution," ATLASSOLUTIONS.COM, Jul. 25, 2005, 3 pages.
Atlas On Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar (web print out date is Jun. 22, 2006—3 pages).
"Atlas On Demand, Concurrent, and Everstream Strike Video-On-Demand Advertising Alliance", ATLASSOLUTIONS.COM, Jul. 13, 2006, 3 pages.
"Cable Solution Now, The Industry Standard for Information Management: Strata's TIM.net Crosses Important Threshold Dominant Solution for All Top 20 TV Markets," STRATAG.COM, Apr. 28, 2006, 1 page, http://stratag.com/news/cablepress042806.html.
"Claritas Forms Life Insurance Consortium with Worldwide Financial Services Association: Initiative with LIMRA International is First of its Kind to Provide Actual Sales Information at Small Geographic Areas," CLARITAS.COM, Feb. 9, 2006, 3 pages, http.
"Claritas Introduces PRIZM NE Consumer Electronic Monitor Profiles: New Information Product Provides Insight Into the Public's Purchasing Behaviors of Consumer Electronics," CLARITAS.COM, May 30, 2006, 3 pages.
"Epsilon Leads Discussion on Paradigm Shift in TV Advertising," EPSILON.COM, Jun. 24, 2004, 2 pages, http://www.epsilon.com/who-pr_tvad040624.html.
"Information Resources, Inc. and Navic Networks From Joint Relationship to Support Next Generation of Technology for Advertising Testing, IRI Expands BehaviorScan® Solution to Meet Digital and On-demand Needs," INFORES.COM, Feb. 27, 2006, 2 pages, http:/.
"IRI and Acxiom Introduce More Efficient and Actionable Approach to Consumer Segmentation and Targeted Marketing," EU-MARKETINGPORTAL.DE, Jan. 26, 2006, 2 pages, http://www.eu-marketingportal.de/web/index.cfm/IRI_and_Acxiom_Introduce_More_Efficient_and.
"Mediamark Research Inc. Releases Findings From Mobile Marketing Consumer Study; Outback Steakhouse and Royal Caribbean Cruise Lines Among Brands Participating in Mobile Marketing Research," THEFREELIBRARY.COM, May 9, 2006, 4 pages, http://thefreelibrary.
"SRC Announces Free Dashups to Mashups Adding Geographic Business Intelligence at Web Speed to the Enterprise on www.FreeDemographics.com/API," DIRECTIONSMAG.COM, Jun. 12, 2006, 3 pages, http://www.directionsmag.com/press.releases/index.php?duty=Show&id=1.
"SRC Delivers Industry's First Drive Time Engine Developed to Follow Actual Road Networks," THOMASNET.COM, May 21, 2006, 4 pages, http://news.thomasnet.com/companystory/485722.
"VOD Integration Now Available in Strata: Buyers / Sellers Benefit from VOD Component on Popular Platform," STRATAG.COM, Feb. 21, 2006, 1 page, http://www.stratag.com/news/mediapress022106.html.
Bachman, Katy, "Arbitron, VNU Launch Apollo Project," MEDIAWEEK.COM Jan. 17, 2006, 3 pages, http://www.mediaweek.com/mw/search/article_display.jsp?schema=&vnu_content_id=1001847353.
Bitran, Gabriel et al., "Mailing Decisions in Catalog Sales Industry", Management Science, vol. 42, No. 9, Sep. 1996, pp. 1364-1381.
Bult, Jan Roelf et al., "Optimal Selection for Direct Mail", Marketing Science, vol. 14, No. 4 (1995), pp. 378-394.
Click Z, "ISPs Collect User Data for Behavioral Ad Targeting," dated Jan. 3, 2008 as downloaded from http://www.clickz.com/showPage.html?page=clickz on Apr. 16, 2008.
CNET NEWS.COM, "Target me with your ads, please," dated Dec. 5, 2007 as downloaded from http://www.news.com/2102-1024_3-6221241.html?tag+st.util.print on Mar. 18, 2008.
Cowie, Norman E., Warning Bells & "The Bust-Out", Business Credit, Jul. 1, 2000.

Creamer, Matthew, "Consulting in marketing; Accenture, others playing role in firms' processes," Crain's Chicago Business, Jun. 12, 2006, 2 pages, Crain Communications.

Delany, Kevin J., et al. Firm Mines Offline Data to Target Online Ads; Commercial Alert; as downloaded from http://www.commercialalert.org/news/archive/2007/10/firm-mines-offline . . . on Apr. 22, 2008.

eFunds Corporation, Data & Decisioning, Debit Report, http://www.efunds.com/web/industry-solutions/financial-services/fr . . . .

Elmasri et al., "Fundamentals of Database Systems, Third Edition (Excerpts)," Jun. 2000, pp. 253, 261, 268-270, 278-280, 585, 595.

Fair Isaac Introduces Falcon One System to Combat Fraud, Business Wire, May 5, 2005.

Fair Isaac Offers New Fraud Tool, National Mortgage News & Source Media, Inc., Jun. 13, 2005.

Front Porch Brochure, "Ad Networks—Partner with Front Porch!: Our Internet-Wide Behavioral Targeting Brings Ad Networks Higher Revenue", 2 pages.

Front Porch Brochure, "New Free Revenue for Broadband ISPs!: Get your share of the $20 billion online advertising market!", 2 pages.

Fusun Gonul et al., "Optimal Mailing of Catalogs: A New Methodology Using Estimable Structural Dynamic Programming Models", 14 pages, Management Science, vol. 44, No. 9, Sep. 1998.

Hakan Polatoglua and Izzet Sahinb, Probability distributions of cost, revenue and profit over a warranty cycle, European Journal of Operational Research, vol. 108, Issue 1. Jul. 1, 1998, p. 170-83.

Halliday, Jean, "Ford recruits Accenture for marketing plan," Automotive News Feb. 13, 2006, 2 pages, Crain Communications.

Haughton, Dominique et al., "Direct Marketing Modeling with CART and CHAID", Journal of Direct Marketing, vol. 11, No. 4, Fall 1997, p. 42-52.

Helm, Burt, "Nielsen's New Ratings Yardstick," BUSINESSWEEK.COM, Jun. 20, 2006, 3 pages, http://www.businessweek.com/technology/content/jun2006/tc20060620_054223.htm.

Hinman, Donald P., "The Perfect Storm: Response Metrics and Digital TV," CHIEFMARKETER.COM, May 17, 2006, 2 pages, http://www.chiefmarketer.com/crm_loop/roi/perfect-storm-051706/index.html.

International Preliminary Report for PCT/US2008/064594, Dec. 10, 2009.

International Search Report for PCT/US2007/06070, Nov. 10, 2008.
International Search Report for PCT/US2007/21815; Sep. 5, 2008.
International Search Report for PCT/US2007/63822, Sep. 11, 2007.
International Search Report for PCT/US2007/63823, Oct. 24, 2007.
International Search Report for PCT/US2007/63824, Oct. 9, 2007.
International Search Report for PCT/US2008/83939, Jan. 29, 2009.

Jacob, Katy et al., The Center for Financial Services Innovation, A Case Study of Checking Account Inquiries and Closures in Chicago, Nov. 2006.

Klein, Lawrence R. & Goldberger, A.S. (1955) An Econometric Model of the United States: 1929-1952, Amsterdam: North-Holland.

Klein, Lawrence R. (1947) The Keynesian Revolution, New York: MacMillan.

Klein, Lawrence R. et al., he Review of Economic Studies, "A Constant-Utility Index of the Cost of Living", 1960, pp. 84-87, vol. XV-XVI, Kraus Reprint Corporation, New York.

Muus, Lars et al., "A decision theoretic framework for profit maximization in direct marketing", 20 pages, Sep. 1996.

Main Page—Predictive Behavioral Targeting as downloaded from http://www.predictive-behavioral-targeting.com/index.php.Main_Page on Mar. 28, 2008.

NebuAD, Wall Street Journal Online, "Venture Capital: What's New", Oct. 22, 2007, 2 pages, http://www.nebuad.com/company/media_coverage/media_10_22_07.php.

Phorm, Press Release Regarding Exclusive Agreements, 2 pages, http://www.phorm.com/about/launch_agreement.php.

Phorm, "The Open Internet Exchange", 2 pages, http://www.phorm.com/oix.

Otter, Pieter et al., "Direct mail selection by joint modeling of the probability and quantity of response", 14 pages, Jun. 1997.

Rap Interactive, Inc. and Web Decisions, "LiveDecisions", 2 pages.

Reinbach, Andrew, "MCIF aids banks in CRA compliance", Bank Systems & Technology, vol. 32, No. 8, pp. 27, Aug. 1995.

Schmittlein, David C. et al., "Customer Base Analysis: An Industrial Purchase Process Application", Marketing Science, vol. 13, No. 1 (Winter 1994), p. 41-67.

Service Objects: Insight on Demand, Instant Contact Analysis and Lead Verification Solutions, DOTS Web Services—Product Directory, downloaded from www.serviceobjects.com/products/directory_of_web_services.asp, printed Apr. 1, 2009 in 4 pages.

Smith, Wendell R., "Product Differentiation and Market Segmentation as Alternative Marketing Strategies", The Journal of Marketing, Jul. 1956, pp. 3-8, vol. XXI, The American Marketing Association, Brattleboro, Vermont, U.S.A.

Stone, "Linear Expenditure Systems and Demand Analysis: An Application to the Pattern of British Demand", The Economic Journal: The Journal of the Royal Economic Society, 1954, pp. 511-527, vol. LXIV, Macmillan & Co., London.

Tackling the Issue of Bust-Out Fraud, Retail Banker International, Jul. 24, 2007.

Various Posts from 2003 and 2004 at http://web.archive.org/web/2005045221950/http://p2p.wrox.com/topic.asp?TOPIC_ID=6513.

Whitney, Daisy, "Atlas Positioning to Shoulder VOD Ads; Campaign Management Tools Optimize Inventory," GOLIATH.COM, May 23, 2005, 2 pages, http://goliath.ecnext.com/coms2/gi_0199-4340604/Atlas-Positioning-to-shoulder-VOD.html.

Working, Holbrook, "Statistical Laws of Family Expenditure", Journal of the American Statistical Association, 1943, pp. 43-56, vol. 38, American Statistical Association, Washington, D.C.

"New FICO score extends lenders' reach to credit-underserved millions", Viewpoints: News, Ideas and Solutions from Fair Isaac, Sep./Oct. 2004 as downloaded from http://www.fairisaac.com/NR/exeres/F1780009-B47A-444F-BD11-8B4D7D8B3532.fram . . . .

Burr Ph.D., Sara et al., "Payment Aggregation and Information Dissemination (Paid): Annotated Literature Search", Asset Builders of America, Inc., Sep. 2005.

How to Reach the Growing "Thin File Market: Huge Immigration Market and Other Groups with Little or No Credit History May Be Creditworthy . . . ", Josh Kessler, ABA Banking Journal, vol. 97, 2005.

The Benefit to Consumers from Generic Scoring Models Based on Credit Reports. Chandler et al., The MDS Group Atlanta, Georgia, Jul. 1, 1991, Abstract.

What's the Score. Walter Alexander, ABA Banking Journal, vol. 81, 1989, Abstract.

AFX New Limited—AFX International Focus, "Nielsen moving to measure off-TV viewing," Jun. 14, 2006, 1 page.

DEMOGRAPHICSNOW.COM, sample reports, "Age Rank Report", Jul. 17, 2006, 3 pages.

DEMOGRAPHICSNOW.COM, sample reports, "Consumer Expenditure Summary Report", Jul. 17, 2006, 3 pages.

DEMOGRAPHICSNOW.COM, sample reports, "Income Comparison Report", Jul. 17, 2006, 4 pages.

UPI, "Nielsen Media Research goes electronic," Jun. 14, 2006, 1 page.

* cited by examiner

| Field | Entry |
|---|---|
| First Name | John |
| Last Name | Doe |
| Address | 2040 Main Street |
| City | Irvine |
| State | CA |
| ZIP | 92614 |
| ZIP+4 | 7216 |
| Customer PIN | 1234567 |
| Age | 45 |
| Length Of Residence | 5 |
| Demographic Data * * * | |
| Scoreable Credit Data * * * | |

510: First Name, Last Name
520: Address, City, State, ZIP, ZIP+4
530: Customer PIN
540: Age
550: Length Of Residence
560: Demographic Data
570: Scoreable Credit Data
501

Figure 5A

| Field | Entry |
|---|---|
| First Name | John |
| Last Name | Doe |
| Address | 2040 Main Street |
| City | Irvine |
| State | CA |
| ZIP | 92614 |
| ZIP+4 | 7216 |
| Customer PIN | 1234567 |
| Age | 45 |
| Length Of Residence | 5 |
| Demographic Data * * * | |
| (Empty) Scoreable Credit Data * * * | |

SYSTEMS AND METHODS FOR DETERMINING THIN-FILE RECORDS AND DETERMINING THIN-FILE RISK LEVELS

CROSS-REFERENCE TO RELATED APPLICATIONS

This application is a continuation of U.S. patent application Ser. No. 12/818,096 filed on Jun. 17, 2010, entitled "SYSTEMS AND METHODS FOR DETERMINING THIN-FILE RECORDS AND DETERMINING THIN-FILE RISK LEVELS," scheduled to be issued as U.S. Pat. No. 8,024,264, which is a continuation of U.S. patent application Ser. No. 11/871,572 filed on Oct. 12, 2007, entitled "SYSTEMS AND METHODS FOR DETERMINING THIN-FILE RECORDS AND DETERMINING THIN-FILE RISK LEVELS," issued as U.S. Pat. No. 7,742,982, which claims the benefit of priority under 35 U.S.C. §119(e) of U.S. Provisional Application No. 60/923,060 filed on Apr. 12, 2007, entitled "SYSTEMS AND METHODS FOR PROSPECTING IN A THIN FILE ENVIRONMENT." The disclosures of all of the above referenced applications are hereby incorporated by reference in their entireties. All publications and patent applications mentioned in this specification are herein incorporated by reference to the same extent as if each individual publication or patent application was specifically and individually indicated to be incorporated by reference.

TECHNICAL FIELD

This disclosure relates generally to financial data processing systems, and more particularly to methods and systems for developing filters to identify thin-file credit records and assess a risk level associated with thin-file credit records.

DESCRIPTION OF THE RELATED ART

Various financial service providers provide credit accounts such as mortgages, automobile loans, credit card accounts, and the like, to consumers. Financial service providers typically determine whether or not to offer a particular consumer a credit account and on what terms based upon a credit history acquired by the consumer over a period of time. A consumer credit history may reflect the credit related activities of the consumer, such as taking out loans, making payments, or the like, and may be embodied in a report or score.

However, some consumers have little or no credit history. For example, young people often do not have any credit history. This situation can make it difficult for a financial service provider to determine whether a consumer represents a "good" or "bad" credit risk, even though reaching the consumer before they have a significant credit history may be an effective way to build new business.

SUMMARY OF THE INVENTION

Accordingly, systems and methods are disclosed for determining the likelihood of a consumer having a thin-file record (for example, little or no credit record) and assessing a risk level associated with a potential thin-file consumer.

According to one embodiment, a computing system may determine whether existing credit records are either scoreable records or thin-file records. The two groups of records may be analyzed, such that non-credit data variables that correlate or are otherwise related to a likelihood of an individual being a thin-file record are determined. These correlated variables are weighted and combined to generate a multi-level filter. The multi-level filter is configured to provide a score related to a likelihood of an individual having a thin-file record based on non-credit data.

According to another embodiment, a computing system filters thin-file records to determine those having at least one transaction entry. Those thin-file records that have at least one transaction entry are further filtered based on whether the transaction entry is in good standing. Demographic characteristics and non-credit data that correlate with or are otherwise related to being a "good" or "bad" credit risk are determined by comparing the characteristics of those thin-file records having a transaction entry that is "good" with those that are "bad." A multi-level filter is developed based on these variables that provide a score related to the credit-risk associated with a thin-file record based on non-credit data.

These and additional embodiments are discussed in greater detail below. Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings and examples which form a portion of the specification, in which:

FIGS. 5A-C show credit database records utilized to develop the thin-file filters according to one embodiment.

DESCRIPTION OF THE PREFERRED EMBODIMENTS

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
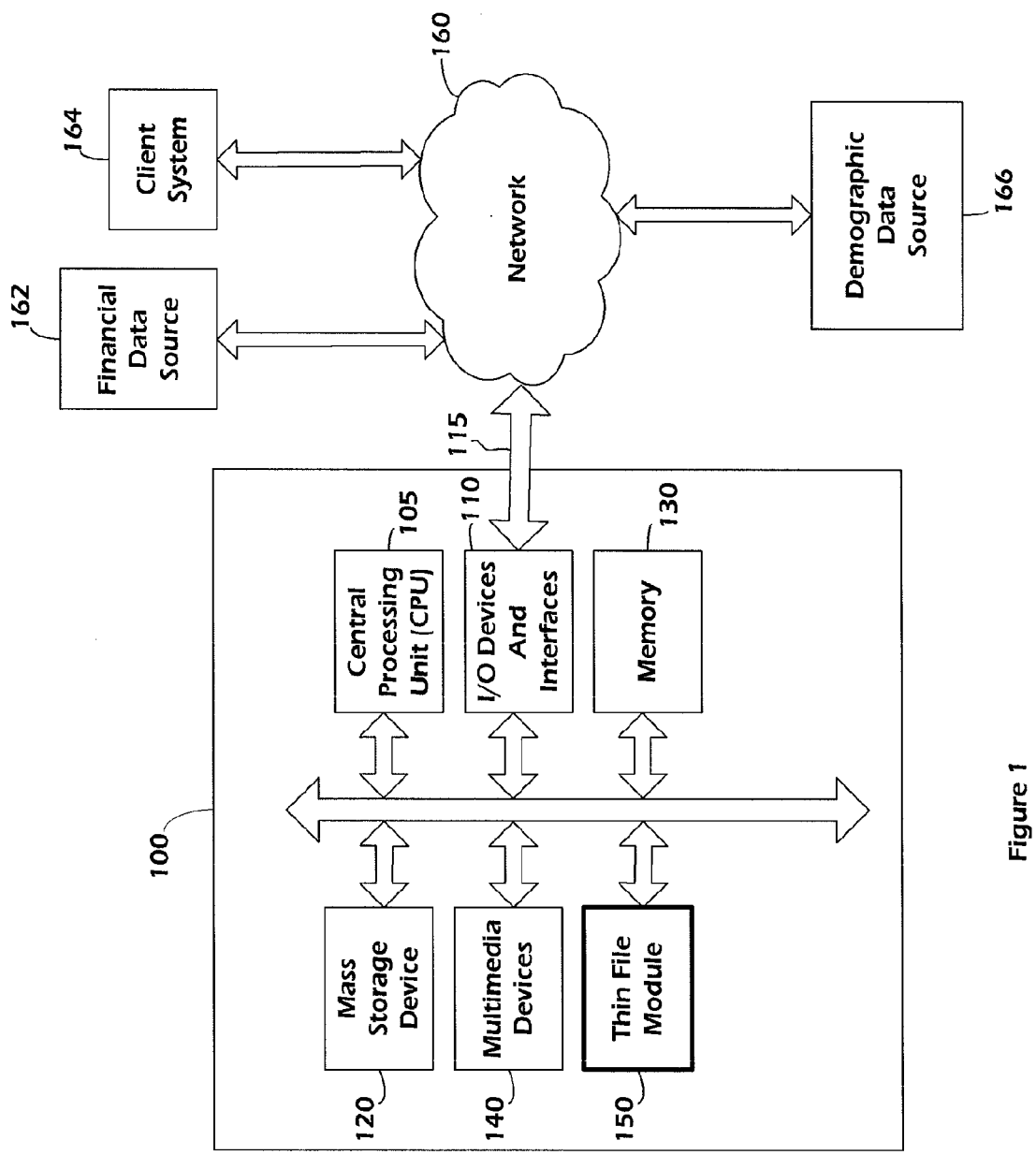
FIG. 1 is a block diagram of a system for generating and applying filters to determine a likelihood of being a thin-file record and an associated risk level according to one embodiment.

FIG. 1 is one embodiment of a block diagram of a computing system 100 that is in communication with a network 160 and various devices and/or systems that are also in communication with the network 160. The computing system 100 may be used to implement certain systems and methods described herein. For example, the computing system 100 may be configured to analyze demographic information in order to determine a likelihood that a consumer has a thin-file record and to determine a credit risk associated with the thin-file record. Although the description provided herein refers to individuals, consumers, or customers, the terms "individual," "consumer," and "customer" should be interpreted to include applicants, or groups of individuals or customers or applicants, such as, for example, married couples or domestic partners, and business entities. The functionality provided for in the components and modules of computing system 100 may be combined into fewer components and modules or further separated into additional components and modules.

The computing system 100 includes, for example, a personal computer that is IBM, Macintosh, or Linux/Unix compatible. In one embodiment, the computing system 100 comprises a server, a laptop computer, a cell phone, a personal digital assistant, a kiosk, or an audio player, for example. In one embodiment, the exemplary computing system 100 includes a central processing unit ("CPU") 105, which may include a conventional microprocessor. The computing system 100 further includes a memory 130, such as random access memory ("RAM") for temporary storage of information and a read only memory ("ROM") for permanent storage of information, and a mass storage device 120, such as a hard drive, diskette, or optical media storage device. Typically, the modules of the computing system 100 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 100 is generally controlled and coordinated by operating system software, such as Windows 95, Windows 98, Windows NT, Windows 2000, Windows XP, Windows Vista, Linux, SunOS, Solaris, or other compatible operating systems. In Macintosh systems, the operating system may be any available operating system, such as MAC OS X. In other embodiments, the computing system 100 may be controlled by a proprietary operating system. Conventional operating systems control and schedule computer processes for execution, perform memory management, provide file system, networking, I/O services, and provide a user interface, such as a graphical user interface ("GUI"), among other things.

In the embodiment of FIG. 1, the computing system 100 also includes a thin-file module 150 that may be executed by the CPU 105. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Thin-file module 150 of the computing system 100 operates to generate filters that are applied to consumer records in a demographic database for determining whether a consumer is likely to be a thin-file record and to define a risk level associated with potential thin-file records, based on demographic data and/or other non-credit data. It is also recognized that other data may be used. The thin-file module 150 further operates to apply these filters to existing and potential customer demographic database records, and to generate reports based on the application of these filters. For example, a report may be generated for a client system 164 that indicates individual consumers or groups of consumers having certain characteristics associated with "good" risk thin-file consumers so that the client system 164 may target marketing efforts to those consumers. Thin-file module 150 and the operations thereof are described in more detail below.

The exemplary computing system 100 includes one or more commonly available input/output (I/O) devices and interfaces 110, such as a keyboard, mouse, touchpad, and printer. In one embodiment, the I/O devices and interfaces 110 include one or more display device, such as a monitor, that allows the visual presentation of data to a user. More particularly, a display device provides for the presentation of GUIs, application software data, and multimedia presentations, for example. The computing system 100 may also include one or more multimedia devices 140, such as speakers, video cards, graphics accelerators, and microphones, for example.

In the embodiment of FIG. 1, the I/O devices and interfaces 110 provide a communication interface to various external devices. In the embodiment of FIG. 1, the computing system 100 communicates with a network 160, such as a LAN, WAN, or the Internet, for example, via a wired, wireless, or combination of wired and wireless, communication link 115. The network 160 communicates with various computing devices and/or other electronic devices and/or systems via wired or wireless communication links.

According to FIG. 1, information is provided to computing system 100 over the network 160 from one or more data sources including, for example, one or more of the financial data sources 162, the client system 164, and one or more demographic data sources 166. The information supplied by the various data sources may include credit data, demographic data, application information, product terms, accounts receivable data, and financial statements, for example. Financial data sources may comprise a regulated credit database storing consumer records having demographic data, non-credit data, and credit data. Demographic data source 166 may comprise an unregulated demographic database storing consumer records having demographic and other non-credit data.

In addition to the devices and systems that are illustrated in FIG. 1, the network 160 may communicate with other data sources or other computing devices and/or systems. In addition, the data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

Client system 164 may include, for example, a financial service provider or a collection agency. One client system 164 is shown, but any number of clients 164 may communicate with the computing system 100 over the network 160. The client system 164 may provide data related to consumer credit activity, such as opening new accounts, making payments on existing accounts, or the like. In addition to supplying data, client system 164 may further request and/or receive information from the computing system 100. For example, the client system 164 may request information related to thin-file accounts analyzed by the computing system 100.

The network 160 may comprise one or more networks in some embodiments, as described above. The financial data sources 162, client system 164, demographic data sources 166, and any additional data sources may communicate over the same network or over different networks. For example, financial data sources 162 may comprise public data available over the Internet, while the computing system 100 may access demographic data source over a secured LAN. In some embodiments, one of the data sources such as financial data sources 162 comprises multiple sources, and some of the sources are available to computing system 100 over the network 160 while others are accessed via another connection, such as a LAN.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Figure 2:
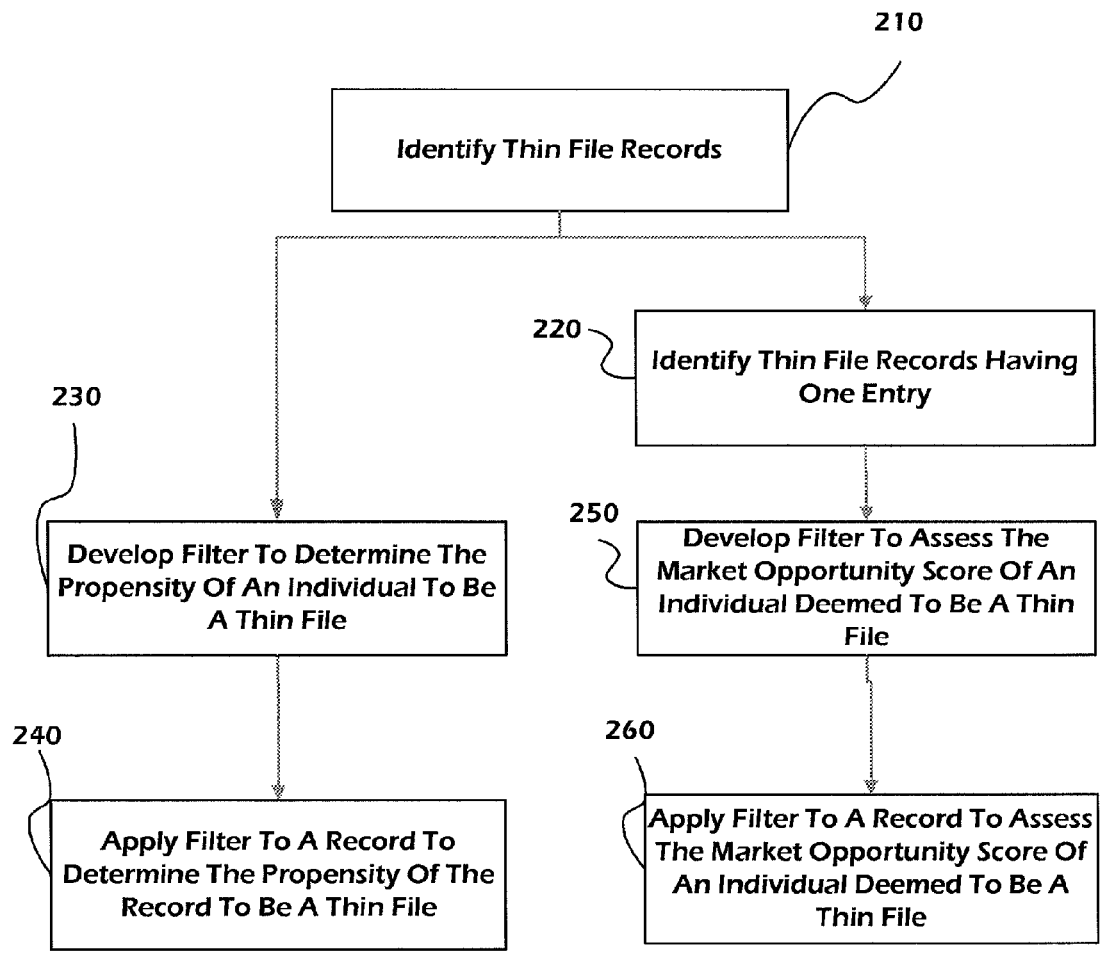
FIG. 2 is a flowchart showing a process for generating and applying filters to determine a likelihood of being a thin-file record and an associated risk level according to one embodiment.

FIG. 2 shows one embodiment of a process 200 for identifying thin-file records and developing filters for analyzing new thin-file applicants based on demographic or other non-credit data. In some embodiments, the process 200 is a computer-implemented process that is stored and runs on the computing system 100. In one embodiment, the process 200 applies the filter to the data based on two or more attributes or collections of attributes of consumer records in a demographic database. Thus, the filter may be a single-level filter or a multi-level filter. As one example, one level of the filter may be directed to one or more of the demographic data fields such as marital status whereas another level of the filter may be directed to attributes associated with a geographic area.

Process 200 begins at state 210 where thin-file records are identified. Thin-file records may be identified, for example, within a credit database stored by computing system 100 or available as a financial data source 162 over the network 160. In one embodiment, thin-file records comprise those records which do not include a sufficient amount of credit related data to provide a score or other metric for assessing the credit-worthiness of a consumer associated with that record. For example, consumers that do not have a long credit history, have never had a credit card or a loan, or for whatever reason, do not have sufficient amount of credit data to develop a score may be identified as thin-file records. In some embodiments, thin-file records are those records having either zero transaction entries or one transaction entry, where a transaction entry corresponds to a credit related activity such as applying for a loan or taking out a credit card. In some embodiments, the records relate to a specific country or region.

At state 220, those records identified as being thin-file records and having at least one transaction entry are identified. Thus, at state 220, records within a credit database may be identified as either a scoreable record, a thin-file record having at least one transaction entry, or a thin-file record.

At state 230, a filter is developed to determine the propensity of an individual to be a thin-file record based on demographic data in the records of the credit database. In one embodiment, based on the tracked thin-file records identified at state 210, a filter is developed that, when applied to a set of data in a demographic database, determines whether or not a consumer is likely to be a thin-file record based on non-credit data. At state 240, the filter is applied to a record in a demographic database, for example of a new or potential credit applicant, to determine whether or not the consumer related to that record is likely to be a thin-file record. In other embodiments, the filter is applied to a set of consumer records in a demographic database. In other embodiments, other databases may be used.

The one-entry thin-file records identified at state 220 may also be used to develop a filter at state 250 to assess the risk score of an individual deemed to be a thin-file. For example, those one-entry thin-file records may be filtered to determine whether or not the existing entry represents "good" or "bad" credit activity. The state of being a "good" or "bad" credit risk, or a quantitative representation of credit worthiness along a scale, may be correlated with demographic information or other non-credit data included within the credit record. Thus, a filter may be developed for assessing a risk level that is not dependent on credit information, but rather on demographic data and other information that is likely to be available for a potential applicant from a demographic database. At state 260 the filter developed at state 250 is applied to a record in a demographic database to determine the risk score of an individual deemed to be a thin-file record.

As an example case, the filters developed at state 230 may be used to identify particular demographic groups, such as those people living in a certain area or having certain characteristics, that are likely to be thin-file records. Records corresponding to those groups may be further analyzed by the filter developed at state 250 to determine whether or not they are likely to be "good" credit risks. Thus, for example, a group of people such as those people in a zip code area that is known to have "good" credit consumers living therein may be targeted, for example, for a mailing campaign.

Figure 3:
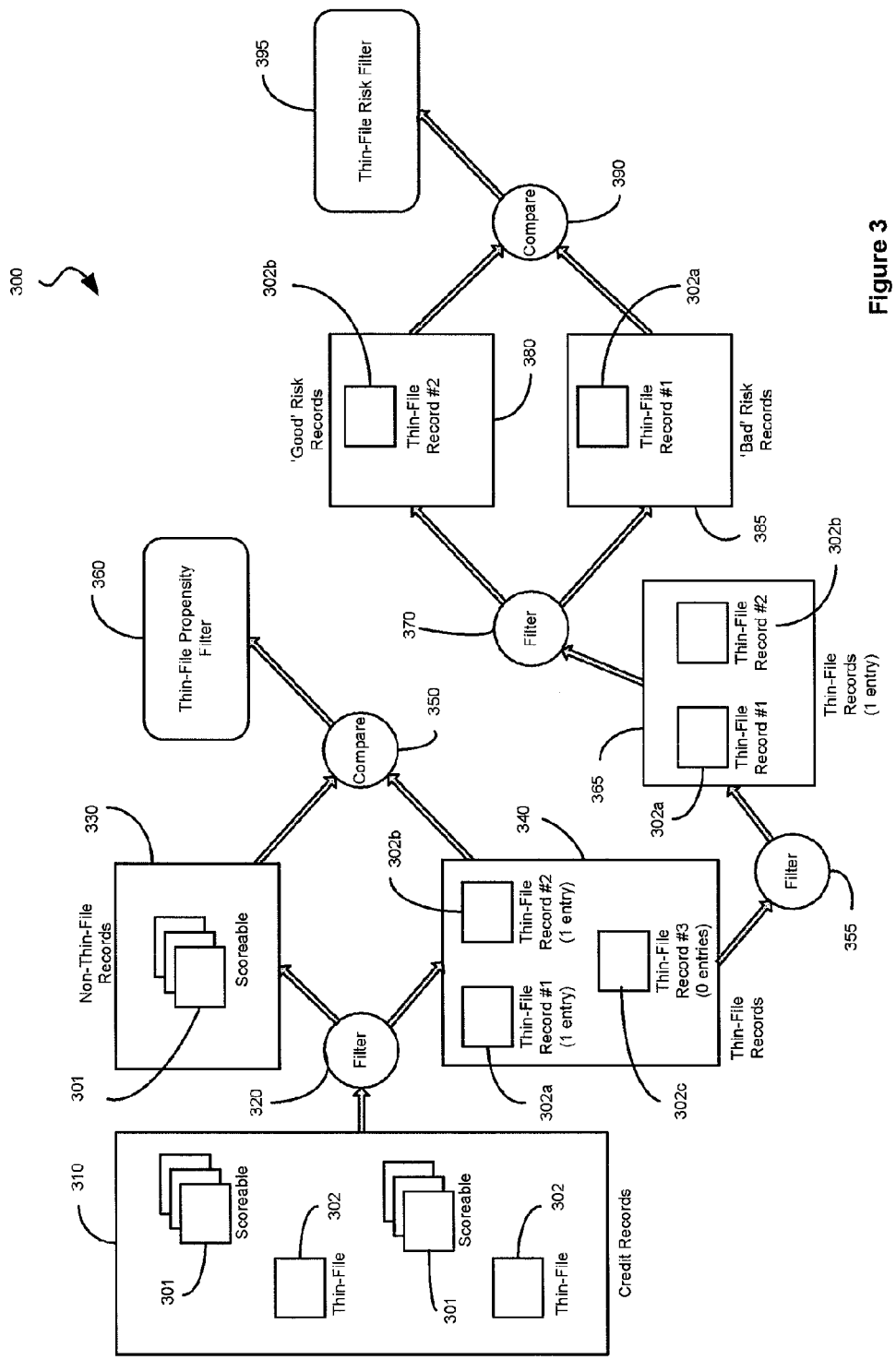
FIG. 3 is a process diagram showing the processing of credit records to develop thin-file filters according to one embodiment.

FIG. 3 is a diagram showing one embodiment of a process 300 for filtering and comparing credit records in order to develop a thin-file propensity filter 360 and a thin-file risk filter 395. In some embodiments, the process 300 is a computer-implemented process that is stored and runs on the computing system 100. The process 300 begins when credit records 301 and 302 in a credit record database 310 are filtered at state 320. The credit record database 310 may, according to some embodiments, be stored in the memory 130 of the computing system 100 and/or may be accessed over the network 160. The credit record database 310 may comprise records relating to a large number of consumers, such as more than one million. In some embodiments, credit database 310 is a regulated database. Credit record database 310 comprises scoreable credit records 301 and thin-file (for example, non-scoreable) credit records 302. Records in a set of the records are compared at state 320. In some embodiments, the set is all of the records, a subset of the records, or a random subset of the records. Those records that are determined to be thin-file records may be identified as a thin-file record collection 340. Those records that are scoreable may be identified as a non-thin-file record collection 330.

As shown, scoreable record collection 330 comprises scoreable record 301 sorted by a filter at state 320 from credit database 310. Scoreable record collection 330 may identify any number of scoreable records 301.

Thin-file record collection 340 comprises thin-file records 302a, 302b, and 302c filtered from credit database 310 at state 320. Three thin-file records 302a, 302b, and 302c are shown in FIG. 3. However, any number of thin-file records may be identified in thin-file record collection 340. The number of thin-file records stored in the thin-file record collection 340 is related to the number of thin-file records stored in credit database 310.

In order to develop the thin-file propensity filter 360, records identified by scoreable record collection 330 and records identified by thin-file record collection 340 are compared at state 350. That is, all or a subset of the scoreable records 301 identified by the scoreable record collection 330 are compared with all or a subset of the thin-file records 302 identified by the thin-file record collection 340 at state 350. The scoreable records 301 are compared with thin-file records 302 on the basis of, for example, the demographic information therein. It is determined at state 350 what demographic characteristics or other non-credit data correlates to, is dependent on, or is otherwise related to a record being either a thin-file record 302 or a scoreable record 301. Certain characteristics or variables may be directly related, such as a length of time at a current residence. Other variables may be indirectly related. For example, it may be determined that individuals living within a geographic area having certain characteristics such as a low average income are more likely to have thin-file records. In that case, the thin-file propensity filter 360 may be developed such that the geographic area in which a consumer resides and the characteristics of that area are taken into account. In general, the thin-file propensity filter 360 may apply weights to values of certain characteristics. In addition to those mentioned above, characteristics used to determine whether or not an individual is likely to be a thin-file record may comprise, for example, the individual consumer's percentage of bank cards reported delinquent in a geographic area, the length of residence at the consumer's current residence, the average length of residence for consumers in a certain geographic area, the percentage of households in an area comprising families rather than individuals, the age of the consumer, some combination of these or other characteristics, or the like. In some embodiments, certain characteristics may be excluded even though they are determined to be related. For example, a consumer age may be relevant but removed because certain credit decisions made by a client 164 cannot be dependent on age according to government regulations. Characteristics may be converted into quantitative representations. For example, a characteristic may comprise a consumers' presence in an age group between 18-20 years old, corresponding to a "yes" or "no" value. A quantitative value of "1" or "0" may be assigned to each possibility. The quantitative representations may comprise binary values as described above, some other set of discrete values, or numerical values along a continuous scale. The values are weighted in the filter according to their importance or correlation to the presence or absence of a thin-file condition.

FIG. 3 also shows a process for developing a thin-file risk filter 395. While the development of thin-file risk filter 395 is shown interleaved with that for creating thin-file propensity filter 360, the two may be independent.

Utilizing a thin-file record collection 340, the thin-file records are filtered at state 355 to identify those thin-file records having one transaction entry. As shown in FIG. 3, thin-file records 302a and 302b have only one entry, while thin-file record 302c has zero entries. Thin-file records 302a and 302b are therefore identified in a one-entry collection 365. One-entry collection 365 is shown identifying two thin-file records, but may identify any number of thin-file records. While the embodiment shown filters the thin-file records 302 based on whether they comprise one or zero entries, in some embodiments the thin-file records may comprise more than one entry, and the filter 355 may filter the thin-file records based on some other predetermined minimum number of entries.

At state 370 thin-file records identified by one-entry collection 365 are filtered. Thin-file records 302a and 302b are filtered to determine whether or not these records correspond to "good" or "bad" credit risks. Although thin-file records 302a and 302b are shown being filtered, all of the records identified by the one-entry collection 365, or a subset of the records identified by the one-entry collection 365, may be filtered. Filtering may comprise a determination of the existing transaction entry for a thin-file record is a "good" risk or a "bad" risk. After it is determined whether or not thin-file records 302a and 302b are "good" or "bad" credit risks, they are identified by "good" risk collection 380 or "bad" risk collection 385. In the example shown, "good" risk collection 380 identifies thin-file record 303b. "Bad" risk collection 385 identifies thin-file record 303a.

At state 390, the records identified by "good" risk collection 380 and "bad" risk collection 385 are compared. The compared records are used to generate a thin-file risk filter 395. Thin-file risk filter 395 determines the likelihood of a thin-file record being a "good" or "bad" risk based on demographic data or other non-credit data. "Good" risk records 302b identified by collection 380 are compared with "bad" risk records 302a identified by collection 385 to determine those demographic or other non-credit characteristics most closely correlated with or otherwise related to being a "good" or "bad" risk. For example, data that may be used to indicate whether or not an applicant is likely to be a "good" credit or "bad" credit risk may comprise the likelihood of individuals in the same geographic area being "good" or "bad" credit risks, the number of credit related accounts or activities certain geographic area engages in, an age group, scores based on such characteristics as average income in a geographic area or purchasing habits of people living in the geographic area, or the like.

Thin-file risk filter 395 may therefore be used to determine, based on demographic characteristics of a potential thin-file applicant stored in a demographic database, whether or not that applicant is likely to be a "good" or a "bad" risk. Thin-file risk filter 395 may, for example, provide a score for a consumer based on the determined characteristics that are significant, and that score may be associated with a certain likelihood that the applicant is a "good" risk. A high score may correspond to a high likelihood of being a "good" risk. For example, the highest possible score for the thin-file risk filter 395 may correspond to a 75% chance of being a "good" risk. The score may be a quantitative representation of the risk associated with a thin-file applicant such as, for example, a credit risk. The scale of the score may be arbitrary or may be aligned with well known credit scoring systems or other scoring systems.

Figure 4:
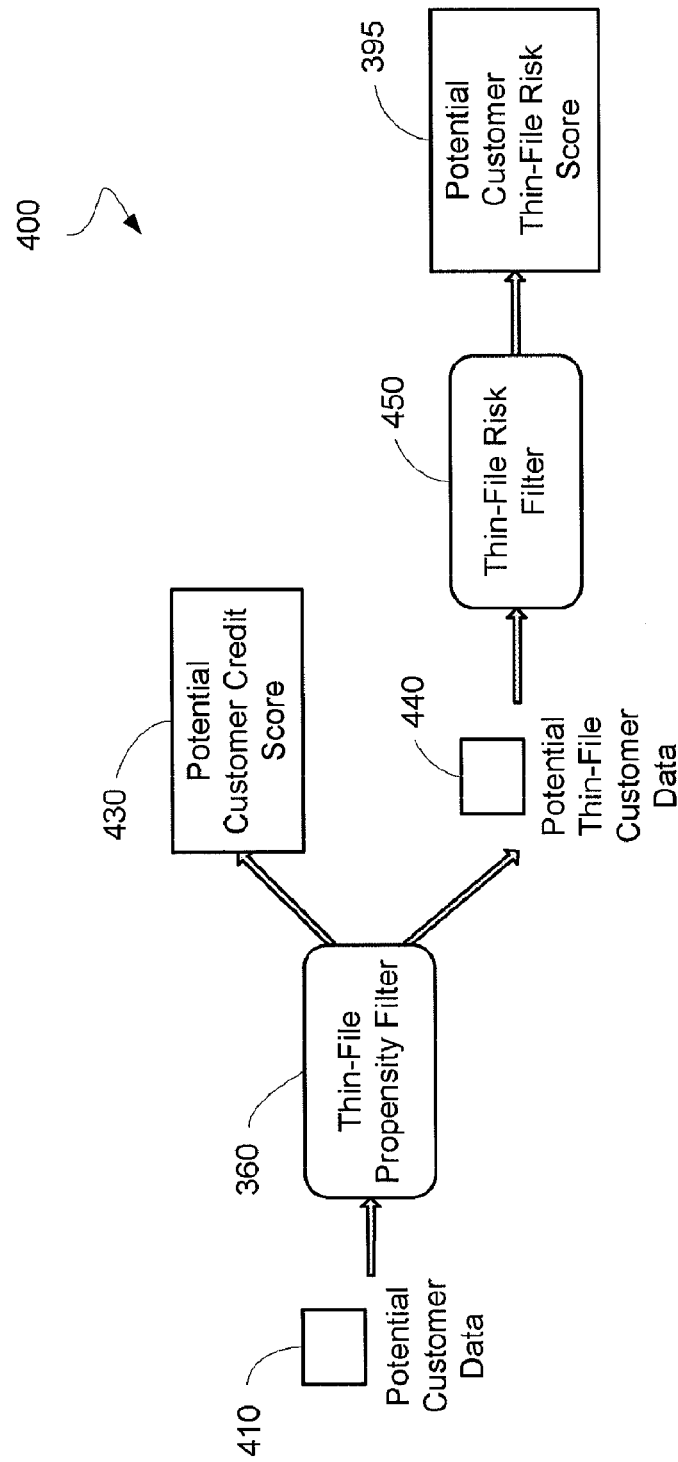
FIG. 4 is a process diagram showing the processing of potential customer data by the filters developed in FIG. 3 according to one embodiment.

FIG. 4 shows a system process 400 for utilizing a thin-file propensity filter 360 and a thin-file risk filter 395 in order to determine whether or not a potential customer is likely to be a thin-file record and what risk is likely associated with the potential customer. In some embodiments, the process 400 is a computer implemented process that is stored and runs on the computing system 100. The process 400 shows the application of the thin-file propensity filter 360 and the thin-file risk filter 450 as related processes, such that a portion of the files output by the thin-file propensity filter 360 may be used as input files by the thin-file risk filter 450. However, the filters may also be utilized independently, as both may operate on existing data and provide independently useful results.

Process 400 begins with potential customer data 410. Potential customer data 410 may reflect, for example, demographic data for a specific applicant or for one or more groups of applicants or potential applicants, such as potential targets for a direct mailing campaign.

Demographic information from potential customer data 410 is provided as an input to the thin-file propensity filter 360 from a demographic database. The thin-file propensity filter 360 is applied to the potential customer data 410 for each consumer to generate a score related to the likelihood of the consumer being a thin-file record based on non-credit data. Based on the score or likelihood determined by the thin-file propensity filter 360, consumer records in potential customer data 410 are identified as either scoreable records or thin-file records. For example, a cut-off score may be determined, and any consumer having a score higher than that value may be determined to be a potential thin-file record 440. In some embodiments, this score is a score for which there is a greater than 50% likelihood that a record is a thin-file record. For those records which are not thin-file records, a potential customer credit score 430 may be determined. Those records that have a score above the predetermined value may comprise known thin-file records 440.

A thin-file risk filter 450 may be applied to potential thin-file records 440 in order to determine the potential customer risk score 460. For example, potential thin-file customer data 440 may comprise demographic information associated with one or more consumers or potential customers obtained from a demographic database. Demographic information may include, for example, the consumer's age, the consumer's residence, the length at that residence, the geographic area surrounding the residence, or some other demographic indicator. The thin-file risk filter may take this demographic information as an input and analyze characteristics that determine if a potential customer is a thin-file risk 460. The thin-file risk filter may directly associate certain geographic data, but may also associate economic indicators associated with certain geographic locations in order to determine a potential customer thin-file risk score 460. Potential customer thin-file risk score 460 may be utilized to determine whether or not to provide an applicant a credit account, or the specific terms associated with an account to offer a potential customer. In other embodiments, a potential customer thin-file risk score 460 may be used to determine whether or not to direct marketing efforts towards a potential customer.

Figure 5C:
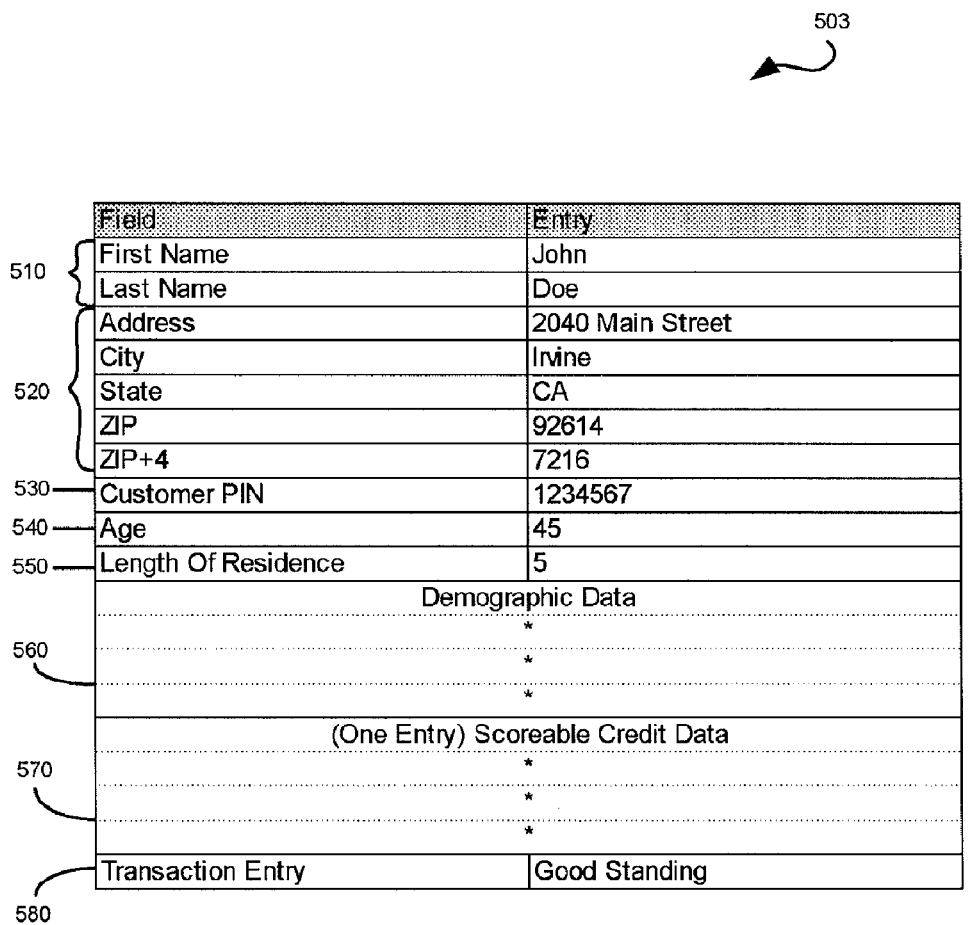

FIGS. 5A-C show example embodiments of records from a credit database that may be utilized according to generate the thin-file filters described above. For example, FIG. 5A shows a record 501 comprising a scoreable credit record. Scoreable credit record 501 comprises first and last name fields 510, geographic residence fields 520, a customer pin field 530 comprising a unique identifier, an age field 540, a length of residence field 550 identifying the amount of time the consumer has lived at his or her current residence, demographic data fields 560, and scoreable credit data 570. Demographic data field 560 may comprise, for example, other demographic data not shown in the other fields above and/or one or more of the data fields shown may be excluded. Scoreable credit data 570 may comprise, for example, information on loan accounts, outstanding credit accounts, payment histories, and the like.

FIG. 5B shows a non-scoreable or thin-file credit record 502. Credit record 502 comprises name fields 510, address fields 520, customer pin 530, age field 540, length of residence field 550, and demographic data 560. Potential customer record 502 further comprises scoreable credit data 570. However, for customer record 502, the scoreable credit data is empty, and therefore insufficient to form a credit record or to score the credit record. Thus, the credit record 501 shown in FIG. 5A would be associated with a scoreable record, while credit entry 502 shown in FIG. 5B would be associated with a thin-file record.

FIG. 5C shows the credit record 503 for a thin-file record from a credit database. The record 502 includes one transaction entry that may be analyzed in order to determine whether or not the record 502 is a "good" or "bad" credit risk. The record 503 has a single credit entry 580 identifying that the single transaction represents an account in good standing.

Figure 6:
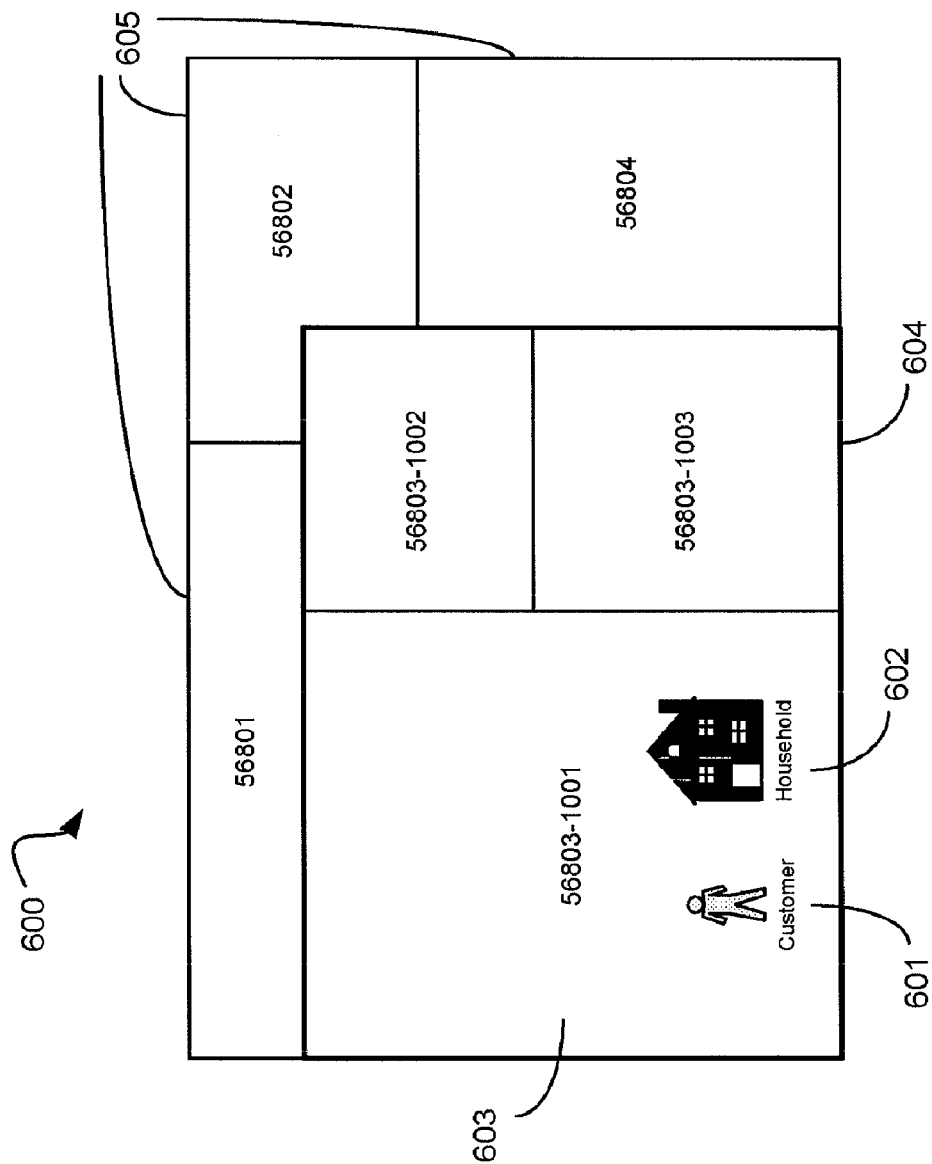
FIG. 6 is a diagram showing various levels of specificity for analyzing demographic data for the thin-file filters according to one embodiment.

FIG. 6 shows one embodiment of an example of different levels of geographic distinctions, in order to demonstrate types of demographic data that may be utilized. FIG. 6 shows a map 600 comprising different areas with different postal codes such as, for the United States, zip codes and zip+4 area codes. For example, map 600 comprises three different zip codes including 56801, 56802, 56803 and 56804. The zip code 56803 corresponding to area 604 is identified here as including potential customers. Potential customer 601, in a household 602 and an area 603, corresponds to zip code 56803-1001. Information concerning the zip+4 area 603 in the zip area 604, may be used as demographic information associated with customer 601 to determine the likelihood of customer 601 being a thin-file record. If customer 601 is a thin-file record, then the likelihood of customer 601 being a "good" or "bad" credit risk may be determined. Information related to household 602 may also be used in the determination, as well as information specifically related to customer 601, such as age.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A computing system, comprising:
   a computer processor configured to access a plurality of records and configured to select a first one or more records that include less than a predetermined amount of credit data;
   a thin-file propensity module executing in the computer processor and configured to: access the selected records; determine first demographic characteristics that are correlated to the selected records based at least on a likelihood that other records that are also associated with one or more of the first demographic characteristics include less than the predetermined amount of credit data; and determine that a first record likely includes less than the predetermined amount of credit data based at least on matching of one or more demographic characteristics associated with the first record to the first demographic characteristics; and
   a risk assessment module executing in the computer processor and configured to determine a risk score associated with the first record based at least on a demographic characteristic associated with the first record.

2. The computing system of claim 1,
   wherein the first demographic characteristics comprise one or more of residence address data, age data, household data, marital status data, delinquent data for consumers in a geographic area, and data related to length of residency.

3. The computing system of claim 1,
wherein one or more of the first demographic characteristics are the same as the demographic characteristic associated with the first record that the risk score determination is based on.

4. The computing system of claim 1,
wherein each of the first demographic characteristics is different than the demographic characteristic associated with the first record that the risk score determination is based on.

5. The computing system of claim 1,
wherein the demographic characteristic associated with the first record that the risk score determination is based on is one of residence address data, age data, household data, marital status data, delinquent data for consumers in a geographic area, or data related to length of residency.

6. A method of identifying a level of risk associated with a thin-file credit record, comprising:
- accessing a first set of records to select a first one or more records which include less than a predetermined amount of credit data;
- determining first demographic characteristics that are correlated to the selected records based at least on a likelihood that other records that are also associated with one or more of the first demographic characteristics include less than the predetermined amount of credit data;
- determining, by at least one computer processor, that a first record likely includes less than the predetermined amount of credit data based at least on matching of one or more demographic characteristics associated with the first record to the first demographic characteristics; and
- determining, by at least one computer processor, a risk score associated with the first record based at least on a demographic characteristic associated with the first record.

7. The method of claim 6,
wherein each of the first demographic characteristics is different than the demographic characteristic associated with the first record that the risk score determination is based on.

8. The method of claim 6,
wherein the demographic characteristic associated with the first record that the risk score determination is based on is one of residence address data, age data, household data, marital status data, delinquent data for consumers in a geographic area, or data related to length of residency.

9. The method of claim 6,
wherein one or more of the first demographic characteristics are the same as the demographic characteristic associated with the first record that the risk score determination is based on.

10. The method of claim 6,
wherein the first demographic characteristics comprise one or more of residence address data, age data, household data, marital status data, delinquent data for consumers in a geographic area, and data related to length of residency.

11. A tangible computer-readable medium having instructions stored thereon, the instructions configured for execution by a computing system having one or more computer processors in order to cause the computing system to:
- access a first set of records to select a first one or more records that include less than a predetermined amount of credit data;
- determine first demographic characteristics that are correlated to the selected records based at least on a likelihood that other records that are also associated with one or more of the first demographic characteristics include less than the predetermined amount of credit data;
- determine that a first record likely includes less than the predetermined amount of credit data based at least on matching of one or more demographic characteristics associated with the first record to the first demographic characteristics; and
- determine a risk score associated with the first record based at least on a demographic characteristic associated with the first record.

\* \* \* \* \*